US010634542B2

(12) United States Patent
Karimian-Sichany et al.

(10) Patent No.: US 10,634,542 B2
(45) Date of Patent: Apr. 28, 2020

(54) ADAPTIVE SYNC CONTROL IN RADAR LEVEL SENSORS

(71) Applicant: Honeywell International Inc., Morris Plains, NJ (US)

(72) Inventors: Masood Karimian-Sichany, North Vancouver (CA); Cristian Andronic, Burnaby (CA); Sudhir Thalore, Surrey (CA); Michael Conroy, Vancouver (CA)

(73) Assignee: Honeywell International Inc., Morris Plains, NJ (US)

( * ) Notice: Subject to any disclaimer, the term of this patent is extended or adjusted under 35 U.S.C. 154(b) by 370 days.

(21) Appl. No.: 15/592,331

(22) Filed: May 11, 2017

(65) Prior Publication Data

US 2017/0370762 A1 Dec. 28, 2017

Related U.S. Application Data

(60) Provisional application No. 62/353,378, filed on Jun. 22, 2016.

(51) Int. Cl.
*G01F 23/284* (2006.01)
*G01S 13/10* (2006.01)
(Continued)

(52) U.S. Cl.
CPC .......... *G01F 23/284* (2013.01); *G01S 7/4004* (2013.01); *G01S 7/4008* (2013.01); *G01S 13/10* (2013.01); *G01S 13/88* (2013.01)

(58) Field of Classification Search
None
See application file for complete search history.

(56) References Cited

U.S. PATENT DOCUMENTS 4,226,118 A 10/1980 Aldrich
4,359,902 A 11/1982 Lawless
(Continued)

FOREIGN PATENT DOCUMENTS

EP 2026046 A2 2/2009
EP 2120062 A2 11/2009
(Continued)

OTHER PUBLICATIONS

International Searching Authority, "Notification of Transmittal of the International Search Report and the Written Opinion of The International Searching Authority, or the Declaration," International Application No. PCT/US2016/050457, dated Nov. 15, 2016, 5 pages, publisher International Application Division Korean Intellectual Property Office, Daejeon, Republic of Korea.
(Continued)

*Primary Examiner* — Whitney Moore

(57) ABSTRACT

A method includes generating first and second timing signals for a level sensor, where the timing signals have a timing difference. The method also includes determining whether the level sensor is able to generate the timing signals so that the timing difference obtains a target value while a control value in a control loop of the level sensor is within defined margins. The method further includes, in response to determining that the level sensor is not able to generate the timing signals so that the timing difference obtains the target value while the control value is within the defined margins, modifying the target value. In addition, the method includes determining whether the level sensor is able to generate the timing signals so that the timing difference obtains the modified target value while the control value is within the defined margins.

17 Claims, 5 Drawing Sheets

(51) Int. Cl.
*G01S 13/88* (2006.01)
*G01S 7/40* (2006.01)

(56) References Cited

U.S. PATENT DOCUMENTS

| | | | |
|---|---|---|---|
| 5,872,494 | A | 2/1999 | Palan et al. |
| 7,461,550 | B2 | 12/2008 | Calabrese |
| 7,800,528 | B2 | 9/2010 | Nilsson et al. |
| 8,803,628 | B1 | 8/2014 | Kroening |
| 8,957,741 | B2 | 2/2015 | Kroening |
| 9,593,976 | B2 | 3/2017 | Nilsson et al. |
| 2003/0206131 | A1 | 11/2003 | Steinbuch |
| 2004/0093942 | A1 | 5/2004 | Brun |
| 2005/0017896 | A1 | 1/2005 | Klofer et al. |
| 2006/0169039 | A1 | 8/2006 | Zalenski et al. |
| 2006/0225499 | A1 | 10/2006 | Gravel et al. |
| 2010/0175470 | A1 | 7/2010 | Schrier et al. |
| 2010/0231438 | A1 | 9/2010 | Ohlsson et al. |
| 2011/0279306 | A1 | 11/2011 | Mouknatjou |
| 2013/0300595 | A1 | 11/2013 | Hemmendorff |
| 2014/0005959 | A1* | 1/2014 | Nilsson .................. G01S 13/88 702/55 |
| 2014/0049334 | A1 | 2/2014 | Kroening |
| 2014/0103950 | A1 | 4/2014 | Janitch |
| 2014/0104014 | A1 | 4/2014 | Kroening |
| 2014/0207395 | A1 | 7/2014 | Prinstil |
| 2015/0011953 | A1 | 1/2015 | Schmidt |
| 2015/0028967 | A1 | 1/2015 | Kroening |
| 2015/0377679 | A1 | 12/2015 | Nilsson et al. |
| 2016/0097670 | A1 | 4/2016 | Hughes et al. |
| 2016/0187180 | A1* | 6/2016 | Alvarado .............. G01F 23/284 73/290 V |
| 2016/0266240 | A1 | 9/2016 | Hughes et al. |
| 2017/0017217 | A1 | 1/2017 | George et al. |
| 2017/0074709 | A1 | 3/2017 | Krolak et al. |
| 2018/0164145 | A1* | 6/2018 | Daufeld ................ G01S 7/4004 |

FOREIGN PATENT DOCUMENTS

| | | |
|---|---|---|
| JP | H07-92252 A | 4/1995 |
| WO | 0102819 A1 | 1/2001 |
| WO | 2005038414 A1 | 4/2005 |

OTHER PUBLICATIONS

International Searching Authority, "Written Opinion of The International Searching Authority," International Application No. PCT/US2016/050457, dated Nov. 15, 2016, 5 pages, publisher International Application Division Korean Intellectual Property Office, Daejeon, Republic of Korea.

European Search Report dated Sep. 15, 2015 in connection with European Patent Application No. EP 15158997.5.

International Searching Authority, "International Search Report," International Application No. PCT/US2015/062593, dated Feb. 2, 2016, 3 pages, publisher The ISA/KR, International Application Division Korean Intellectual Property Office, Daejeon, Republic of Korea.

International Searching Authority, "Written Opinion of The International Searching Authority," International Application No. PCT/US2015/062593, dated Feb. 2, 2016, 6 pages, publisher The ISA/KR, International Application Division Korean Intellectual Property Office, Daejeon, Republic of Korea.

Foreign Communication from Related Counterpart Application; PCT Application No. PCT/US2017/037617; International Search Report and Written Opinion of International Searching Authority dated Aug. 29, 2017; 10 pages.

* cited by examiner

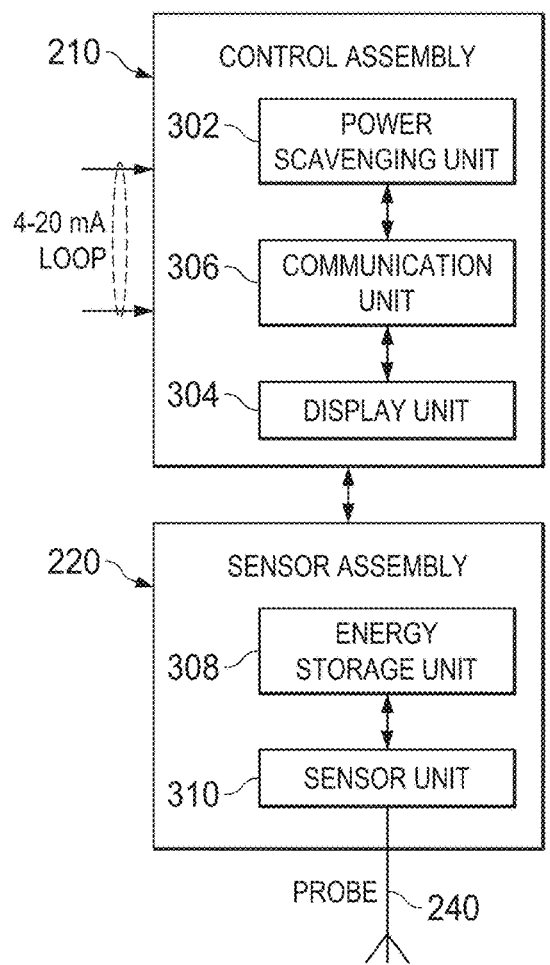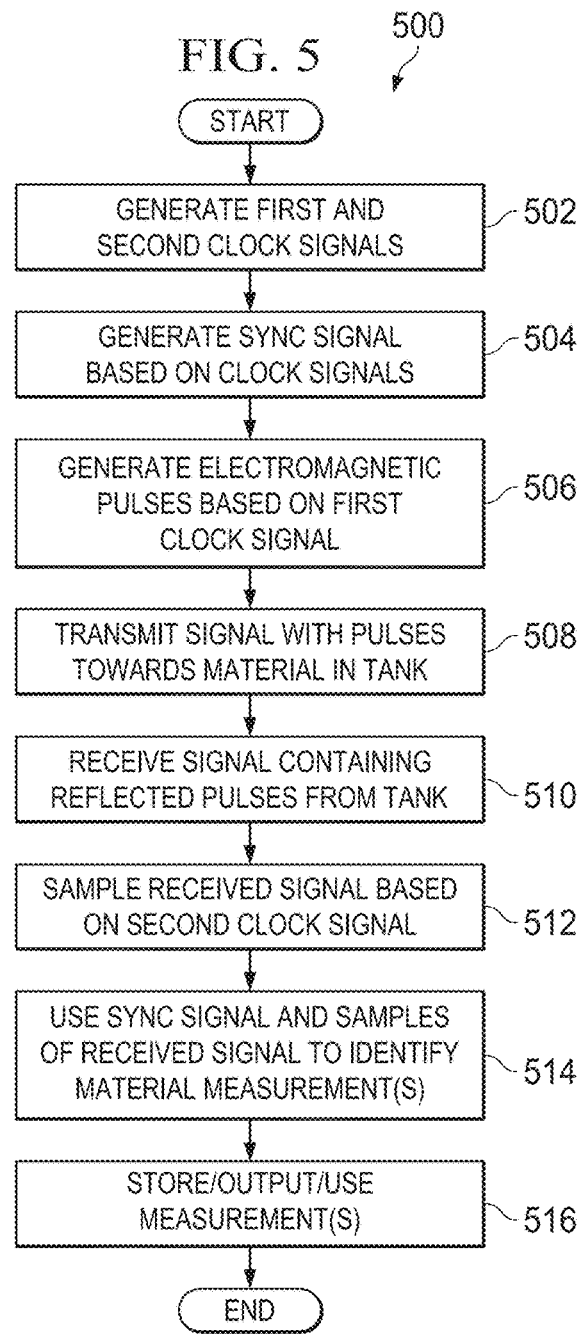

ADAPTIVE SYNC CONTROL IN RADAR LEVEL SENSORS

CROSS-REFERENCE TO RELATED APPLICATION AND PRIORITY CLAIM

This application claims priority under 35 U.S.C. § 119(e) to U.S. Provisional Patent Application No. 62/353,378 filed on Jun. 22, 2016, which is hereby incorporated by reference in its entirety.

TECHNICAL FIELD

This disclosure relates generally to level measurement systems for tanks or other structures. More specifically, this disclosure relates to adaptive sync control in radar level sensors.

BACKGROUND

Processing facilities and other facilities routinely include tanks for storing liquid, solid, or other materials. For example, storage tanks are routinely used in tank farm facilities and other storage facilities to store oil or other materials. As another example, oil tankers and other transport vessels routinely include numerous tanks storing oil or other materials. Processing facilities also often include tanks for implementing industrial processes.

Often times, it is necessary or desirable to measure the amount of material stored in a tank. This may be useful, for example, during loading of material into the tank or unloading of material from the tank or during liquid stock accounting. As a particular example, "legal metrology" often requires highly accurate measurements from a level sensor installed on the roof of a tank, such as during custody transfers or when levying taxes or duties. In bulk storage tanks, an error of one millimeter in a level reading can correspond to several cubic meters of volumetric error. This can result in losses of thousands of dollars for one or more parties. Moreover, this can have negative effects on stock reconciliation, which involves attempting to track where materials are located and how materials are lost.

SUMMARY

This disclosure provides adaptive sync control in radar level sensors.

In a first embodiment, a method includes generating first and second timing signals for a level sensor, where the timing signals have a timing difference. The method also includes determining whether the level sensor is able to generate the timing signals so that the timing difference obtains a target value while a control value in a control loop of the level sensor is within defined margins. The method further includes, in response to determining that the level sensor is not able to generate the timing signals so that the timing difference obtains the target value while the control value is within the defined margins, modifying the target value. In addition, the method includes determining whether the level sensor is able to generate the timing signals so that the timing difference obtains the modified target value while the control value is within the defined margins.

In a second embodiment, an apparatus includes a controller configured to control first and second signal generators of a level sensor. The controller is also configured to determine whether the signal generators are able to generate first and second timing signals so that a timing difference between the timing signals obtains a target value while a control value in a control loop of the level sensor is within defined margins. The controller is further configured, in response to determining that the signal generators are not able to generate the timing signals so that the timing difference obtains the target value while the control value is within the defined margins, to modify the target value. In addition, the controller is configured to determine whether the signal generators are able to generate the timing signals so that the timing difference obtains the modified target value while the control value is within the defined margins.

In a third embodiment, a system includes a transceiver configured to transmit signals toward material in a tank and to receive reflected signals from the material in the tank. The system also includes a controller configured to generate measurements for the material in the tank based on the reflected signals. The system further includes first and second signal generators configured to generate first and second timing signals for the transceiver. In addition, the system includes a detector configured to generate a sync signal identifying a timing difference between the timing signals. The controller is also configured to use the sync signal to determine whether the signal generators are able to generate the timing signals so that the timing difference obtains a target value while a control value in a control loop is within defined margins. The controller is further configured, in response to determining that the signal generators are not able to generate the timing signals so that the timing difference obtains the target value while the control value is within the defined margins, to modify the target value. In addition, the controller is configured to determine whether the signal generators are able to generate the timing signals so that the timing difference obtains the modified target value while the control value is within the defined margins.

In a fourth embodiment, a non-transitory computer readable medium contains instructions that, when executed by one or more processing devices, cause the one or more processing devices to determine whether signal generators are able to generate first and second timing signals for a level sensor so that a timing difference between the timing signals obtains a target value while a control value in a control loop of the level sensor is within defined margins. The medium also contains instructions that when executed cause the one or more processing devices, in response to determining that the signal generators are not able to generate the timing signals so that the timing difference obtains the target value while the control value is within the defined margins, to modify the target value. The medium further contains instructions that when executed cause the one or more processing devices to determine whether the signal generators are able to generate the timing signals so that the timing difference obtains the modified target value while the control value is within the defined margins.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 3 illustrates an example control assembly and an example sensor assembly of a level sensor according to this disclosure;

FIG. 5 illustrates an example method for inventory management using a level sensor according to this disclosure.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
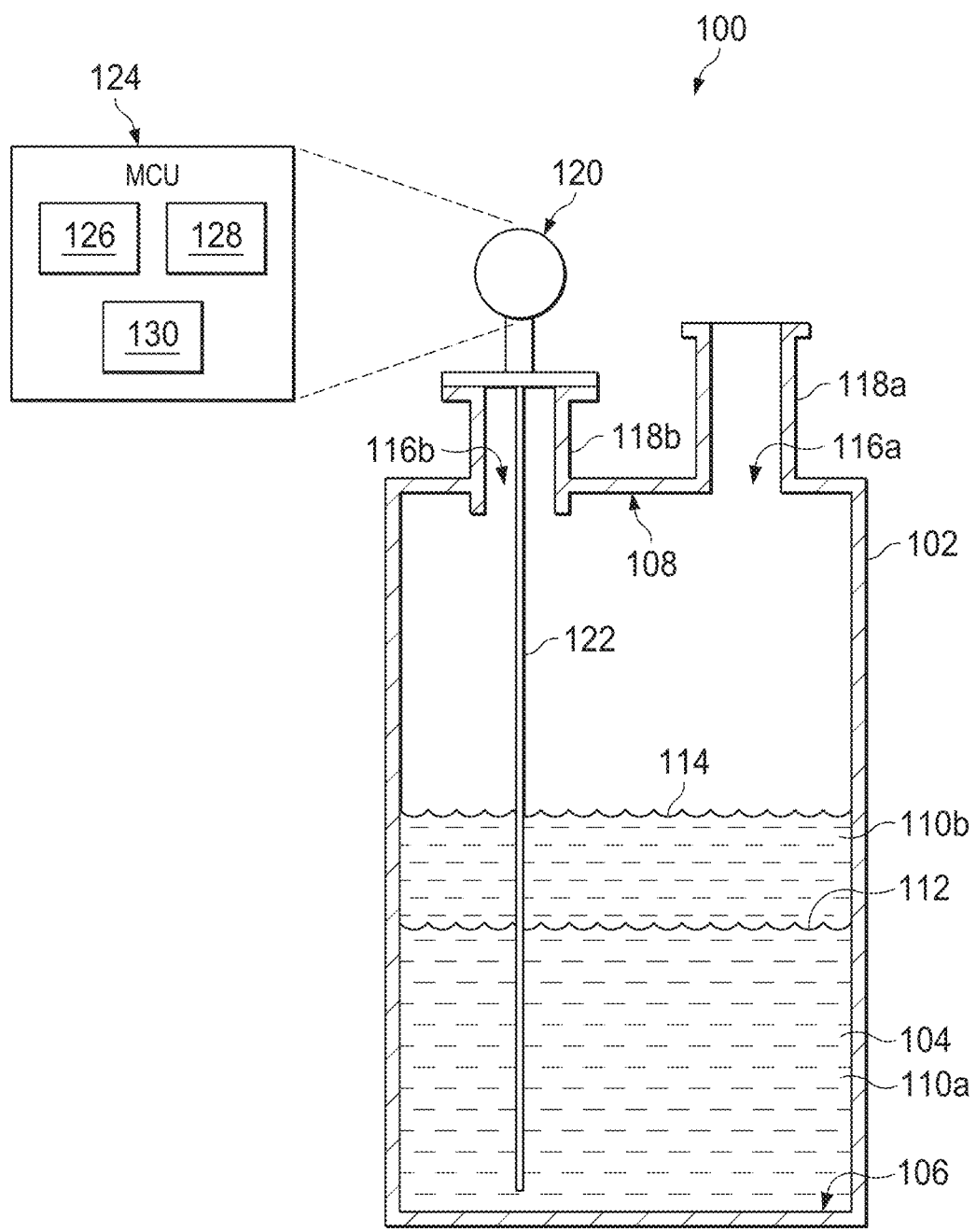
FIG. 1 illustrates an example inventory management system according to this disclosure.

FIG. 1 illustrates an example inventory management system 100 according to this disclosure. As shown in FIG. 1, the system 100 includes a tank 102, which represents any suitable structure for receiving and storing at least one material 104. The tank 102 can have any suitable shape, size, and dimensions. The tank 102 can also form part of a larger structure, such as any fixed or movable structure containing or associated with one or more tanks 102 (like a movable tanker vessel, railcar, or truck or a fixed tank farm). In this example, the tank 102 includes a floor 106 at the bottom and a roof 108 at the top.

The tank 102 can be used to store any suitable materials 104, such as one or more fuels, oils, or other processed or unprocessed hydrocarbons, water, or other material(s). Also, a single material 104 could be stored in the tank 102, or multiple materials 104 could be stored in the tank 102. Depending on the materials 104 stored in the tank 102, the materials 104 can sometimes "stratify" or form multiple layers. In the example shown in FIG. 1, there are two layers 110a-110b of material 104, and an interface 112 forms where the top surface of the first layer 110a meets the bottom surface of the second layer 110b. As a particular example, the tank 102 can be used to separate oil from water, in which case the interface 112 represents where the oil separates from the water. Also, an air-material interface exists at the top surface 114 of the second layer 110b, and the air-material interface denotes the top of the material 104 in the tank 102.

The roof 108 of the tank 102 includes one or more openings or ports 116a-116b providing access to an interior of the tank 102, and nozzles 118a-118b can be coupled to the ports 116a-116b. In this example, the nozzle 118a is flush with the roof 108 of the tank 102, while the nozzle 118b is not flush with the roof 108 and extends some distance into the tank 102. However, each nozzle 118a-118b may or may not be flush with the roof 108 of the tank 102. The tank 102 could include any number of openings or ports 116a-116b with any number of nozzles 118a-118b.

A level sensor 120 (such as a guided wave radar or other radar-based level sensor) is mounted on the nozzle 118b. The level sensor 120 captures measurements associated with the material 104 in the tank 102. For example, the sensor 120 could identify a level of the material 104 in the tank 102 as defined by the top surface 114 of the material 104. As another example, the sensor 120 could identify the interface 112 between the layers 110a-110b of material 104 in the tank 102. These values can be used to identify the thickness of one or more of the layers 110a-110b of material 104 in the tank 102. In this example, the sensor 120 is mounted to a top end of the nozzle 118b in order to hold the sensor 120 away from the material 104 even when the tank 102 is full. However, the sensor 120 could be mounted on or to the tank 102 in any other suitable manner.

The level sensor 120 transmits radio frequency (RF) or other signals through the air or over a waveguide 122 and receives reflections of the signals through the air or over the waveguide 122. A main control unit (MCU) 124 of the level sensor 120 processes the reflections to identify the measurements associated with the material 104 in the tank 102. The level sensor 120 includes any suitable structure for transmitting and receiving signals and identifying level measurements. The waveguide 122 includes any suitable structure for directing signals.

In particular embodiments, the level sensor 120 implements Time Domain Reflectometry (TDR) to obtain measurements of the level of material 104 in the tank 102, the location of the interface 112, or other measurements. For example, the level sensor 120 can generate and transmit signals downward into the tank 102 and receive signals reflected off contents within the tank 102. The signals can reflect off the top surface 114 of the material 104, any interfaces 112 between different layers 110a-110b of material in the tank 102, the floor 106 of the tank 102, and any obstacles within the tank 102 (such as agitators, ladders, and heat coils). The level sensor 120 can analyze the received signals and, using time-of-flight calculations, estimate an overall height of the material 104 in the tank 102, the location of the interface(s) 112, or thicknesses of different layers of material 104.

The MCU 124 includes any suitable structure for processing information to identify level measurements and optionally performing other functions, such as control of material loading/unloading. As a particular example, the MCU 124 could include at least one processing device 126, at least one memory 128, and at least one interface 130. Each processing device 126 includes any suitable processing or computing device, such as a microprocessor, microcontroller, digital signal processor (DSP), field programmable gate array (FPGA), application specific integrated circuit (ASIC), or discrete logic devices. Each memory 128 includes any suitable storage and retrieval device, such as a random access memory (RAM), Flash or other read-only memory (ROM), magnetic storage device, solid-state storage device, optical storage device, or other storage and retrieval device. Each interface 130 includes any suitable structure facilitating communication over a connection or network.

As described in more detail below, the level sensor 120 supports the use of adaptive sync control so that the timing between different clock signals is not constant but adjustable to achieve improved performance over a larger operating temperature range. A "sync signal" described below identifies a timing difference between two timing circuits or signal generators used in the level sensor 120. For example, one signal generator used to transmit or receive signals for level measurements can have a fixed frequency, another signal generator used to receive or transmit signals for level measurements can have a variable frequency, and the sync signal can identify a timing difference between these signal generators.

The sync signal is used to define the time interval between two consecutive samples of reflected signals that are received and sampled by the level sensor 120. In order to accurately measure the material level in the tank 102, the timing difference between the signal generators of the level sensor 120 is precisely known during the sampling of the reflected signals. The MCU 124 can measure and adjust the sync signal as needed, such as through a proportional-integral-derivative (PID) or other sync adjustment control loop. The sync adjustment control loop can be executed (such as in the sensor or MCU's firmware) before each data collection interval, at known intervals, or at other times.

In practice, the MCU 124 may attempt to dynamically fine-tune the sync signal and set the sync signal to a constant target value. The sync signal can often be adjusted within a wide range. However, each component of the signal generators typically has an acceptable tolerance and temperature stability. Due to these or other factors, it is possible that the sync signal cannot reach a desired target value in some level sensors due to the inherent tolerance and temperature stability of the signal generators (which is often a result of the variations of all of their components). Moreover, the inability of a sync signal to reach a target value can occur in different level sensors at different temperatures. Because of this, the operating temperature range of the level sensors can be reduced since various level sensors cannot pass environmental and production inspection tests, resulting in wasted products and increased manufacturing costs. While more stable components could be used in a level sensor to reduce or avoid this problem, the more stable components are often much more expensive than standard components used in level sensors.

In accordance with this disclosure, if a sync signal cannot obtain a desired target value in a level sensor 120, the target value is adaptively set to a higher or lower value that is within an adaption range of acceptable values. This allows the target value of the sync signal to be varied within some limits in order to try and obtain acceptable performance of the level sensor 120 over an entire or extended temperature range. For example, the target value can be modified when a level sensor is unable to reach the target value without violating an upper or lower threshold value in its sync adjustment control loop. This approach can help to significantly improve product performance and yields over extended temperature ranges. This approach can also allow the use of relaxed component tolerances, therefore offering potential cost savings. Additional details regarding the use of adaptive sync control in level sensors are provided below.

Although FIG. 1 illustrates one example of an inventory management system 100, various changes may be made to FIG. 1. For example, the functional division shown in FIG. 1 is for illustration only. Various components in FIG. 1 could be combined, further subdivided, rearranged, or omitted or additional components could be added according to particular needs.

Figure 2A:
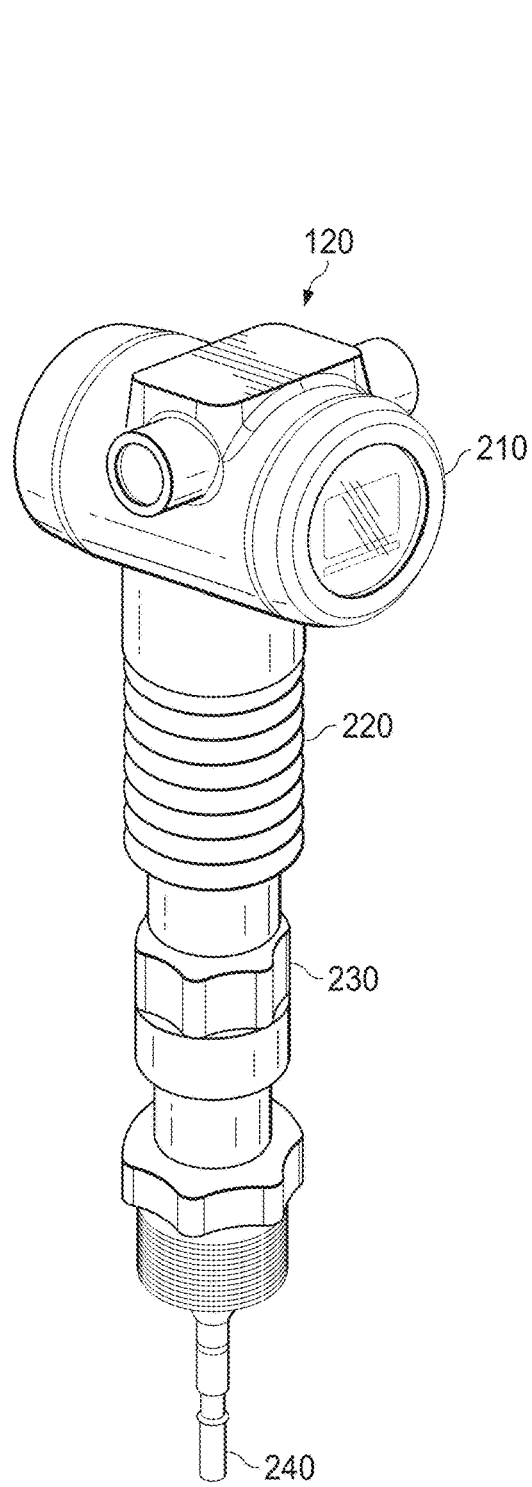
FIGS. 2A and 2B illustrate an example level sensor according to this disclosure.
Figure 2B:
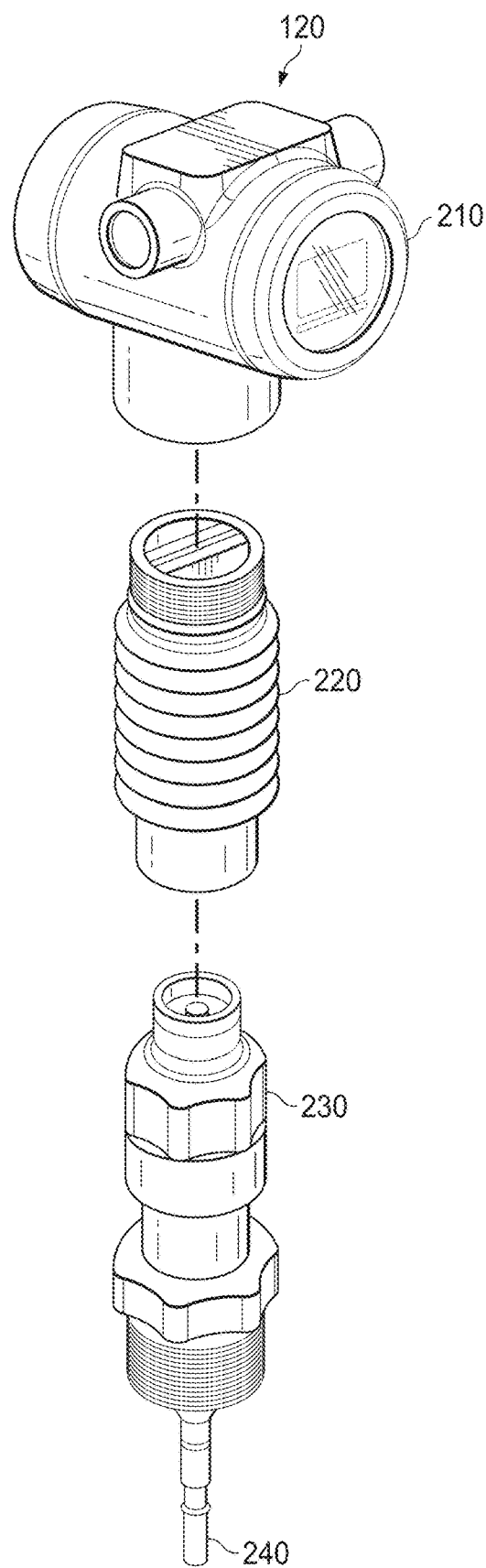

FIGS. 2A and 2B illustrate an example level sensor 120 according to this disclosure. For ease of explanation, the level sensor 120 of FIGS. 2A and 2B is described as being used in the system 100 of FIG. 1. However, the level sensor 120 could be used in any other suitable system.

As shown in FIGS. 2A and 2B, the level sensor 120 includes a control assembly 210, a sensor assembly 220, a process connector 230, and a probe 240. The control assembly 210 supports communications over one or more control loops (such as a 4-20 mA control loop) and interactions with local users. The sensor assembly 220 includes the components of the level sensor 120 that measure the level of material in a tank. For example, the sensor assembly 220 could include a transceiver for sending signals into the tank 102 and receiving reflected signals from the tank 102 and the MCU 124 for calculating the level of the material 104 in the tank 102 using the reflected signals.

The process connector 230 includes a process seal for isolating the sensor assembly 220 from the environment within a tank 102 while allowing the probe 240 to be exposed to the environment within the tank 102. Any suitable process connector 230 could be used with the level sensor 120. The probe 240 carries signals transmitted from the sensor assembly 220 into the tank 102 and to the material 104 and carries signals reflected inside the tank 102 back to the sensor assembly 220. In some embodiments, the probe 240 includes a waveguide, such as the waveguide 122. Example waveguides could include a rod, a rope, a twin rod/rope, and a coaxial probe. Note, however, that the use of a probe or waveguide may not be required in some level sensors.

Although FIGS. 2A and 2B illustrate one example of a level sensor 120, various changes may be made to FIGS. 2A and 2B. For example, internal components within the level sensor 120 could be arranged in any suitable manner within the various sections 210-240 of the level sensor 120. Also, the form factor of the level sensor 120 is for illustration only.

FIG. 3 illustrates an example control assembly 210 and an example sensor assembly 220 of a level sensor 120 according to this disclosure. For ease of explanation, the control assembly 210 and the sensor assembly 220 of FIG. 3 are described as being used in the level sensor 120 of FIGS. 2A and 2B within the system 100 of FIG. 1. However, the control assembly 210 and the sensor assembly 220 could be used in any other suitable device or system.

As shown in FIG. 3, the control assembly 210 houses or otherwise includes a power scavenging unit 302, a display unit 304, and a communication unit 306. The power scavenging unit 302 is configured to be coupled to a control loop (such as a 4-20 mA control loop). The power scavenging unit 302 could harvest operating power for the level sensor 120 over the control loop. However, in other embodiments, the level sensor 120 could be powered in other ways, such as by using a local power supply like a battery or fuel cell. The display unit 304 can present level measurements or other information to a local user on a display. The communication unit 306 supports communications with the sensor assembly 220 and with external components over the control loop. For instance, the communication unit 306 could transmit level measurements (such as in the form of analog or digital process values) over the control loop. Although not shown, the control assembly 210 could also include a user interface for receiving user input parameters, such as one or more buttons or a touchscreen (which could be implemented using the display unit 304).

The sensor assembly 220 includes an energy storage unit 308 and a sensor unit 310. The energy storage unit 308 can receive power via the power scavenging unit 302 (or use internal stored energy from a rechargeable battery, RF power converter, fuel cell, etc.) and supply power to the sensor unit 310. The sensor unit 310 implements the sensor circuitry used for capturing level measurements. One example implementation of the sensor unit 310 is shown in FIG. 4.

Figure 4:
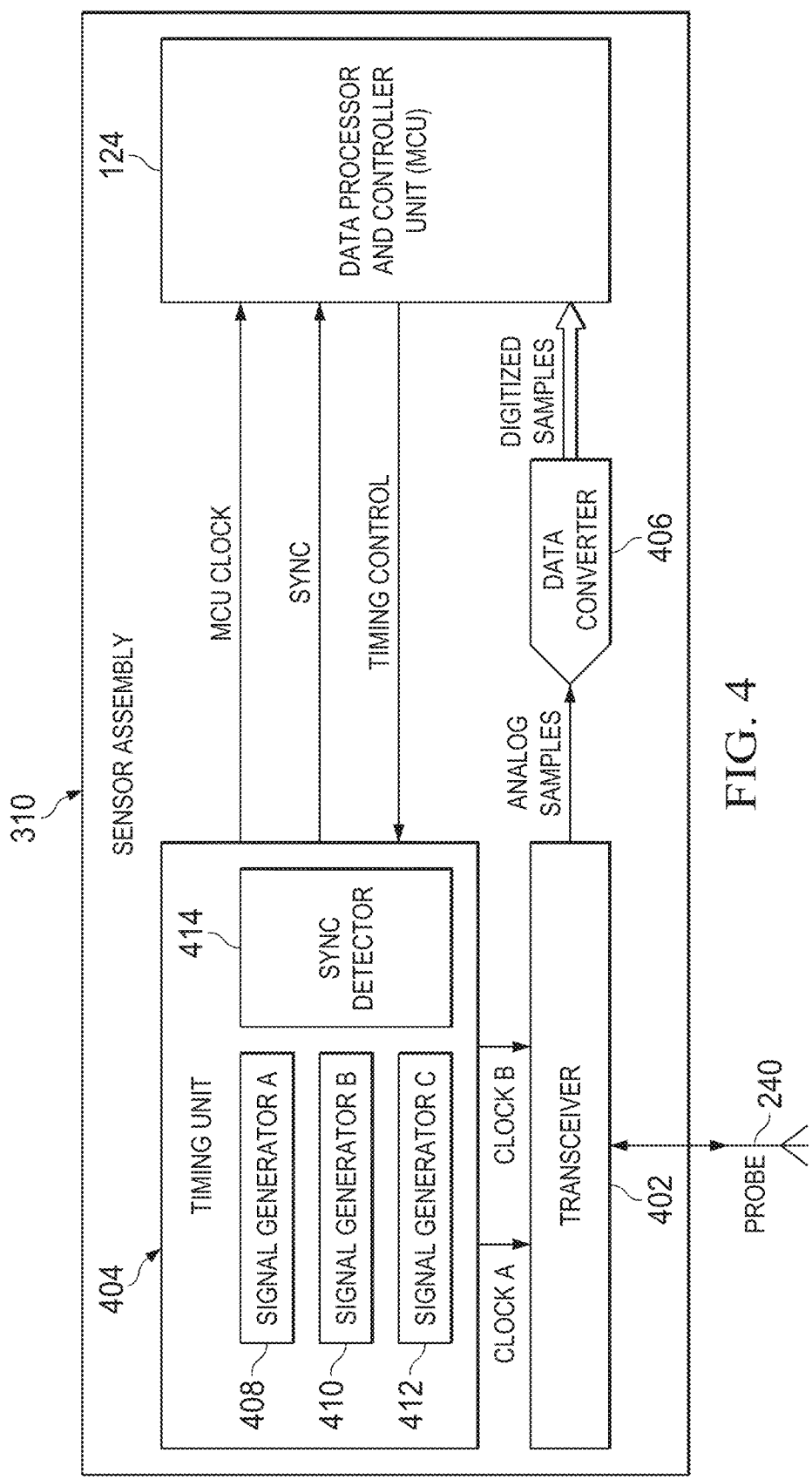
FIG. 4 illustrates an example sensor unit in a sensor assembly of a level sensor according to this disclosure.

FIG. 4 illustrates an example sensor unit 310 in a sensor assembly 220 of a level sensor 120 according to this disclosure. For ease of explanation, the sensor unit 310 of FIG. 4 is described as being used in the level sensor 120 of FIGS. 2A, 2B, and 3 within the system 100 of FIG. 1. However, the sensor unit 310 could be used in any other suitable device or system.

As shown in FIG. 4, the sensor unit 310 includes a transceiver 402, a timing unit 404, a data converter 406, and the MCU 124 (which in this example is implemented as a data processor and controller unit). The transceiver 402 could denote an integrated transmitter/receiver or a transmitter and a separate receiver. The transceiver 402 periodically transmits signals into a tank 102, such as over the probe 240 through the process connector 230. The transmitted signals could, for example, denote or include narrow pulses that are generated at the rising or falling edges of a first clock signal (Clock A). The transmitted signals reflect from various surfaces or objects within the tank 102, such as from the top surface 114 of the material 104, any interfaces 112 between layers of material, the floor 106 of the tank 102, and any obstacles within the tank 102. The transceiver 402 also periodically samples the reflected signals. The reflected signals could, for instance, be sampled upon receipt of narrow pulses at the rising or falling edges of a second clock signal (Clock B).

Analog samples of the reflected signals can be sent to the data converter 406 for digitization. The data converter 406 could, for example, represent one or more analog-to-digital converters (ADCs). The digitized samples can be transferred to the MCU 124 for processing or storage. For example, upon receiving samples of the reflected signals, the MCU 124 could calculate the time of flight for pulses in the signals and generate level measurements based on the time of flight. The identified level measurement(s) can be provided to the control assembly 210 for display or transmission.

The timing unit 404 generates various clock signals for use by other components of the sensor unit 310. For example, a fixed frequency clock (MCU Clock) can be generated for the MCU 124. One fixed frequency clock and one adjustable frequency clock (Clock A and Clock B) can be generated for the transceiver 402, which use the clock signals as described above to transmit pulses and sample reflected signals. A sync signal (Sync) can be generated for the MCU 124, where the sync signal identifies the timing difference between the Clock A and Clock B signals. For instance, the sync signal could have a frequency that equals the frequency difference between the Clock A and Clock B signals, or the sync signal could have a voltage representing the time difference between the Clock A and Clock B signals. The sync signal is used by the MCU 124 to identify the level measurements and to adjust the adjustable frequency clock (one of Clock A or Clock B). The sensor unit 310 can be designed so that the timing difference between the Clock A and Clock B signals (defined by the sync signal) determines the time interval between two consecutive samples of reflected signals received from the tank 102.

The MCU 124 can perform various functions to manage and control different tasks of the level sensor 120. For example, the MCU 124 could monitor the sync signal (such as on a continuous, near-continuous, or intermittent basis) and keep the sync signal at a target value or within a target range. In order to accurately measure the material level in a tank 102, the sync between the Clock A and Clock B signals is precisely known so that the time between transmission and reception of pulses is precisely known. Thus, the MCU 124 can use the sync signal to adjust the frequency of the adjustable frequency clock (Clock A or Clock B), such as through a PID control loop or other sync adjustment control loop implemented as part of the MCU firmware. In some embodiments, the sync adjustment loop can be executed before each data collection interval. The MCU 124 could dynamically fine-tune the sync signal so that it is set to a constant target value. The MCU 124 can also initiate and manage data acquisition by enabling the transceiver 402 and the data converter 406, process measured data and extract level measurements based on configuration parameters, and communicate with the control assembly 210 to receive user settings and report measured material levels.

As shown in FIG. 4, the timing unit 404 includes a signal generator 408 and a signal generator 410. The signal generator 408 can be used to generate the Clock A signal, and the signal generator 410 can be used to generate the Clock B signal. A third signal generator 412 could be used to generate the MCU Clock signal. Each signal generator 408-412 includes any suitable structure for generating a clock signal at a desired (possibly adjustable) frequency. For example, each signal generator 408-412 could be implemented using a low-power CMOS Pierce oscillator.

A sync detector 414 identifies a timing difference between the outputs of the signal generators 408-410. The sync detector 414 also generates an output identifying the timing difference. The output of the sync detector 414 could therefore represent the Sync signal sent to the MCU 124. The sync detector 414 includes any suitable structure for identifying a timing difference between multiple input signals.

Although the timing unit 404 can be designed using industrial components with an acceptable tolerance and temperature stability, the variations of the components can result in unwanted timing variations over different temperatures within the same sensor unit 310 and over different sensor units 310 (even at the same temperature). These variations affect the adjustable range of the sync signal. Therefore, if a specific value is selected as the target value for the sync signal, some sensor units 310 cannot obtain the target value. This can be due to various factors, such as the inherent tolerance and temperature stability of the signal generators. As described above and in more detail below, dynamic adjustment of the target value for the sync signal can be used to help ensure that more level sensors 120 are able to pass production testing or other testing and obtain satisfactory results in the field.

Note that the dynamic modification of the sync signal's target value can be implemented in any suitable manner. For example, the dynamic modification could be performed by firmware of the level sensor 120 or the MCU 124. As a particular example, the dynamic modification of the sync signal's target value could be performed as part of a control loop, such as a PID or other control loop. As noted above, this could occur before each data collection interval, at known intervals, or at other times.

Although FIGS. 3 and 4 illustrate example implementations of components within a level sensor 120, various changes may be made to FIGS. 3 and 4. For example, each of the components in the level sensor 120 could be implemented in any suitable manner. The specific circuits and structures shown in FIGS. 3 and 4 are meant to illustrate example ways in which the level sensor components could be implemented, but other implementations are also possible.

FIG. 5 illustrates an example method 500 for inventory management using a level sensor according to this disclosure. For ease of explanation, the method 500 of FIG. 5 is described as being used in the level sensor 120 of FIGS. 2A, 2B, 3, and 4 within the system 100 of FIG. 1. However, the method 500 could be used in any other suitable device or system.

As shown in FIG. 5, first and second clock signals are generated at step 502, and a sync signal is generated based on the clock signals at step 504. This could include, for example, the signal generators 408-410 in the timing unit 404 generating the Clock A and Clock B signals for the transceiver 402. One of the Clock A and Clock B signals could have a fixed frequency, and the other of the Clock A and Clock B could have a variable frequency. This could also include the sync detector 414 in the timing unit 404 identifying a timing difference between the Clock A and Clock B signals, such as a frequency difference.

Electromagnetic pulses are generated based on the first clock signal at step 506 and transmitted in signals towards material in a tank at step 508. This could include, for example, the transceiver 402 generating signals containing narrow electromagnetic pulses, where the pulses are generated at the rising or falling edges of the Clock A signal. Any number of pulses with any suitable duration(s) and pattern(s) could be generated and transmitted here. This could also include the transceiver 402 transmitting the signals with the pulses over the air or through a waveguide 122 or other probe 240.

Signals containing reflected pulses are received at step 510 and sampled based on the second clock signal at step 512. This could include, for example, the transceiver 402 receiving multiple reflections of the transmitted pulses, such as reflections from the top surface 114, any interfaces 112, the end of the waveguide 122, the floor 106, and any obstacles within the tank 102. This could also include the transceiver 402 sampling the received signals upon receipt of narrow pulses at the rising or falling edges of the Clock B signal. This could further include providing analog samples of the received signals to the data converter 406 for conversion.

The sync signal and the samples of the received signals are used to identify at least one material measurement at step 514. This could include, for example, the processing device 126 of the MCU 124 performing time-of-flight, TDR, or other calculations. Since the sync signal identifies a timing difference between the Clock A and Clock B signals used in the level sensor 120, the processing device 126 uses the sync signal so that the time-of-flight, TDR, or other calculations accurately provide measurements of distance. The material measurement(s) generated here could include any suitable measurement(s), such as a level of material 104 in the tank 102 (like a location or height of the top surface 114), a position of an interface 112 in the tank 102 (like a location or height of the interface 112), or one or more thicknesses of one or more layers 110a-110b of material 104 in the tank 102.

The one or more material measurements could be stored, output, or used in any suitable manner at step 516. This could include, for example, the processing device 126 of the MCU 124 outputting the one or more measurements on a user interface, such as on the display unit 304. This could also include the processing device 126 transmitting the one or more measurements to an external destination for display or use.

Although FIG. 5 illustrates one example of a method 500 for inventory management using a level sensor, various changes may be made to FIG. 5. For example, while shown as a series of steps, various steps in FIG. 5 could overlap, occur in parallel, occur in a different order, or occur any number of times. As a particular example, the method 500 could be repeated any number of times in quick succession to identify multiple measurements, which could be averaged or otherwise processed to generate one or more final measurements.

Figure 6:
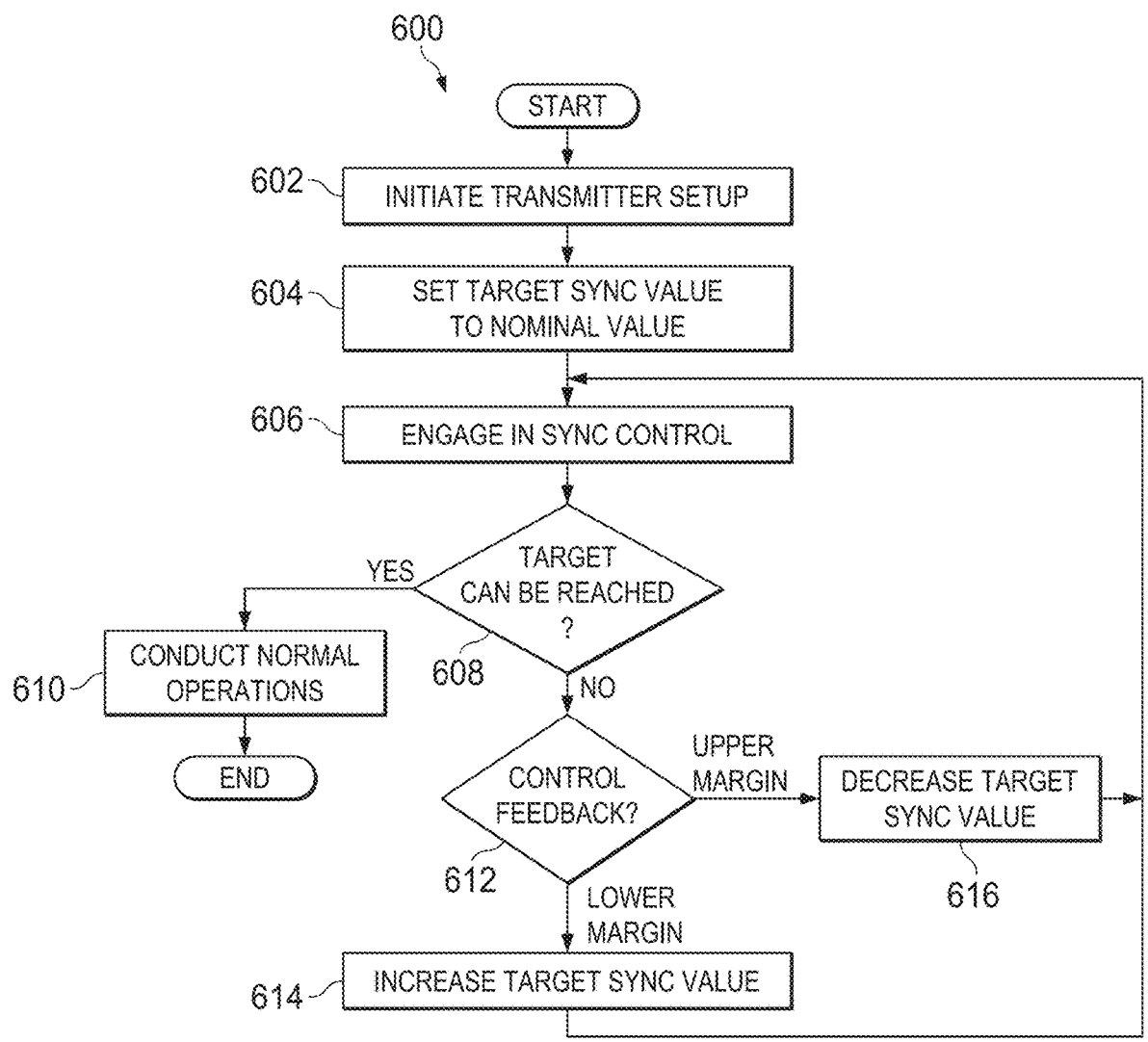
FIG. 6 illustrates an example method for adaptive sync adjustment in level sensors according to this disclosure.

FIG. 6 illustrates an example method 600 for adaptive sync adjustment in level sensors according to this disclosure. For ease of explanation, the method 600 of FIG. 6 is described as being used in the level sensor 120 of FIGS. 2A, 2B, 3, and 4 within the system 100 of FIG. 1. However, the method 600 could be used in any other suitable device or system. Also, note that the method 600 is shown here as being performed as part of sensor startup and initial configuration. However, various steps of the method 600 could occur at other or additional times, such as during sensor operation in the field.

As shown in FIG. 6, a level sensor initiates a startup process at step 602. This could include, for example, the processing device 126 of the MCU 124 performing startup operations to initialize the level sensor 120 and prepare the level sensor 120 for use. A target sync value is set to a nominal value at step 604. This could include, for example, the processing device 126 of the MCU 124 setting the target sync value to any suitable value, such as a midpoint in a range of acceptable sync values. The target sync value denotes the desired value of the sync signal to be obtained (if possible) during operation of the level sensor 120.

The level sensor engages in sync control at step 606. This could include, for example, the processing device 126 of the MCU 124 sending timing control signals to the timing unit 404 in order to adjust the generation of the Clock A signal and/or Clock B signal. This results in changes to the sync signal received by the MCU 124 from the sync detector 414. Ideally, during this time, the processing device 126 is able to adjust the timing unit 404 so that the sync signal reaches the target sync value, but this may not be possible. The level sensor determines whether the target sync value can be reached at step 608. This could include, for example, the processing device 126 of the MCU 124 determining whether the sync signal from the sync detector 414 is approaching or equals the target sync value. If so, the level sensor conducts normal operations at step 610. This could include, for example, the processing device 126 of the MCU 124 using the sync signal while determining level measurements in the manner shown in FIG. 5.

If a determination is made that the target sync value cannot be reached, the level sensor engages in control feedback at step 612. This could include, for example, the processing device 126 of the MCU 124 determining whether a frequency control value used to control one or more of the signal generators 408-410 has reached its upper margin (maximum value) or its lower margin (minimum value). When this occurs, the target sync value can be increased at step 614 if the lower margin has been reached, or the target sync value can be decreased at step 616 if the upper margin has been reached. The process then returns to step 606 so that the level sensor 120 can engage in sync control using the modified target sync value.

In this way, if a target value for a sync signal cannot be reached by a level sensor, the target value is adaptively set to a higher or lower value that is within an adaption range of acceptable values. The inability to reach the target sync value could be caused by a control value (such as the frequency control value) in the sync adjustment control loop reaching its maximum or minimum allowable value. Thus, changing the target sync value may allow the sync signal to reach the modified target sync value while the frequency control value satisfies its constraints. Theoretically, a reasonable change of the sync signal's target value would not impact the accuracy or precision of level measurements from the level sensor 120 to a large extent.

By modifying the control loop for the sync signal's target value in this manner, the level sensor 120 could use the nominal value as the default target value and then try to reach the target value within defined margins of the control loop. If the nominal value cannot be reached because a control value in the control loop has reached an upper limit or margin, the MCU 124 can set the sync signal's target value to a lower frequency. If the nominal value cannot be reached because the control value has reached a lower limit or margin, the MCU 124 can set the sync signal's target value to a higher frequency. In either case, upon changing the sync signal's target value, a timestamp of collected reflected signal samples and level calculation parameters can be modified based on the achieved sync signal.

Note that the changes to the sync signal's target value could occur in any suitable manner. For example, in some embodiments, a target value could immediately be changed to its highest or lowest acceptable value upon the failure to reach the nominal target value. In other embodiments, the target value could be moved in steps up or down, and the step size could be fixed or variable.

Although FIG. 6 illustrates one example of a method 600 for adaptive sync control in level sensors, various changes may be made to FIG. 6. For example, while shown as a series of steps, various steps in FIG. 6 could overlap, occur in parallel, occur in a different order, or occur any number of times.

In the above description, it has been assumed that one clock signal within a level sensor 120 can have a fixed frequency while another clock signal within the level sensor 120 can have a variable frequency. However, other level sensor implementations are also possible. For instance, both the Clock A and Clock B signals described above could be variable. This approach similarly allows the difference between the Clock A and Clock B signals to be adjusted so that the sync signal could ideally reach a target value.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
generating first and second timing signals for a level sensor, the timing signals having a timing difference;
determining whether the level sensor is able to generate the timing signals so that the timing difference obtains a target value while a control value in a control loop of the level sensor is within defined margins, wherein the level sensor conducts an operation when the target value is reached;
in response to determining that the level sensor is not able to generate the timing signals so that the timing difference obtains the target value while the control value is within the defined margins, modifying the target value, wherein the modifying the target value comprises:
decreasing the target value if the target value cannot be reached because the control value has reached an upper margin,
increasing the target value if the target value cannot be reached because the control value has reached a lower margin; and
determining whether the level sensor is able to generate the timing signals so that the timing difference obtains the modified target value while the control value is within the defined margins, wherein the level sensor conducts operation based on the modified target value is reached.

2. The method of claim 1, further comprising:
in response to modifying the target value, modifying a level calculation algorithm to account for an achieved timing difference.

3. The method of claim 1, wherein:
the first timing signal is used by the level sensor to generate a signal containing pulses that is transmitted towards material in a tank; and
the second timing signal is used by the level sensor to sample a signal containing reflected pulses that is received from the tank.

4. The method of claim 1, wherein the control value in the control loop comprises a frequency control value used to control at least one of first and second signal generators that generate the first and second timing signals, respectively.

5. The method of claim 1, wherein:
the timing difference comprises a frequency difference between the first and second timing signals; and
the method further comprises generating a sync signal identifying the frequency difference between the first and second timing signals.

6. The method of claim 1, wherein the determining, modifying, and determining operations occur prior to each measurement of the level sensor.

7. An apparatus comprising:
a controller configured to control first and second signal generators of a level sensor;
wherein the controller is also configured to:
    determine whether the signal generators are able to generate first and second timing signals so that a timing difference between the timing signals obtains a target value while a control value in a control loop of the level sensor is within defined margins, wherein the level sensor conducts an operation when the target value is reached;
    in response to determining that the signal generators are not able to generate the timing signals so that the timing difference obtains the target value while the control value is within the defined margins, modify the target value, wherein the modifying the target value comprises:
        decreasing the target value if the target value cannot be reached because the control value has reached an upper margin,
        increasing the target value if the target value cannot be reached because the control value has reached a lower margin; and
    determine whether the signal generators are able to generate the timing signals so that the timing difference obtains the modified target value while the control value is within the defined margins, the level sensor conducts operation based on the modified target value is reached.

8. The apparatus of claim 7, wherein the controller is further configured, in response to modifying the target value, to modify a level calculation algorithm to account for an achieved timing difference.

9. The apparatus of claim 7, wherein:
the first timing signal is used by the level sensor to generate a signal containing pulses that is transmitted towards material in a tank; and
the second timing signal is used by the level sensor to sample a signal containing reflected pulses that is received from the tank.

10. The apparatus of claim 7, wherein the control value in the control loop comprises a frequency control value used to control one or more of the first and second signal generators.

11. The apparatus of claim 7, wherein:
the timing difference comprises a frequency difference between the first and second timing signals; and
the controller is further configured to receive a sync signal identifying the frequency difference between the first and second timing signals.

12. The apparatus of claim 11, wherein the controller is further configured to use the sync signal to generate measurements associated with material in a tank.

13. A system comprising:
a transceiver configured to transmit signals toward material in a tank and to receive reflected signals from the material in the tank;
a controller configured to generate measurements for the material in the tank based on the reflected signals;
first and second signal generators configured to generate first and second timing signals for the transceiver; and
a detector configured to generate a sync signal identifying a timing difference between the timing signals;
wherein the controller is further configured to:
    use the sync signal to determine whether the signal generators are able to generate the timing signals so that the timing difference obtains a target value while a control value in a control loop is within defined margins, wherein the level sensor conducts operation an operation when the target value is reached;
    in response to determining that the signal generators are not able to generate the timing signals so that the timing difference obtains the target value while the control value is within the defined margins, modify the target value, wherein the modifying the target value comprises:
        decreasing the target value if the target value cannot be reached because the control value has reached an upper margin,
        increasing the target value if the target value cannot be reached because the control value has reached a lower margin; and
    determine whether the signal generators are able to generate the timing signals so that the timing difference obtains the modified target value while the control value is within the defined margins, the level sensor conducts operation based on the modified target value is reached.

14. The system of claim 13, wherein the transceiver is further configured to:
use the first timing signal to generate pulses in the transmitted signals; and
use the second timing signal to sample the reflected signals.

15. The system of claim 13, wherein the control value in the control loop comprises a frequency control value used to control one or more of the first and second signal generators.

16. The system of claim 13, wherein:
the timing difference comprises a frequency difference between the first and second timing signals; and
the sync signal identifies the frequency difference between the first and second timing signals.

17. A non-transitory computer readable medium containing instructions that, when executed by one or more processing devices, cause the one or more processing devices to:
determine whether signal generators are able to generate first and second timing signals for a level sensor so that a timing difference between the timing signals obtains a target value while a control value in a control loop of the level sensor is within defined margins, the level sensor conducts an operation when the target value is reached;
in response to determining that the signal generators are not able to generate the timing signals so that the timing difference obtains the target value while the control value is within the defined margins, modify the target value, wherein the modifying the target value comprises:

decrease the target value if the target value cannot be reached because the control value has reached an upper margin, increase the target value if the target value cannot be reached because the control value has reached a lower margin; and determine whether the signal generators are able to generate the timing signals so that the timing difference obtains the modified target value while the control value is within the defined margins, wherein the level sensor conducts operation based on the modified target value is reached.

* * * * *